Nov. 22, 1966    D. W. HERMANN    3,286,584
ILLUMINATED DOUBLE RETICULE COLLIMATOR
Filed Oct. 18, 1962

INVENTOR.
Donald W. Hermann
BY
Warren D. Hill
ATTORNEY

United States Patent Office 3,286,584
Patented Nov. 22, 1966

3,286,584
ILLUMINATED DOUBLE RETICULE COLLIMATOR
Donald W. Hermann, Milwaukee, Wis., assignor to General Motors Corporation, Detroit, Mich., a corporation of Delaware
Filed Oct. 18, 1962, Ser. No. 231,417
2 Claims. (Cl. 88—14)

This invention relates to collimators and more particularly to an improved means for illumination and alignment of collimators.

Inertially guided missiles are controlled by an inertially stable platform. The direction or azimuth heading that the missile will assume after launching is determined by the physical orientation of the inertially stable platform at the firing instant. The stable platform maintains a space fixed frame of reference during the missile flight. Typically, a theodolite alignment system is used to adjust the stable platform to desired orientation prior to launching. The high degree of precision necessary in missile alignment requires the use of theodolites not only at missile sites, but also in the production of stable platforms. It is essential to accurate operation of theodolite systems that the theodolite be accurately aligned with target collimators which are at fixed reference points. It is the practice to achieve such alignment by focusing an auxiliary telescope at the theodolite on a collimator which comprises an objective lens, a reticule at the focal point of the lens, and a light source behind the reticule. The collimator is located so that the reticule is at the reference point. A second reticule may be placed on the face of the objective lens. Then, to align the telescope with the collimator it is necessary to focus on the first reticule which appears to be at infinity and then to focus on the second reticule. If the two images are not formed in the same position on the telescope field, then the telescope must be moved and the process repeated until this condition is satisfied. However, in order to focus on the second reticule, it is necessary that the telescope be 60 or 100 feet away from the collimator. In some instances it is impossible to achieve such large distances; for example, when the operation is confined to a small observatory. Moreover, when it is desired to focus on the collimator from a distance of 100 feet or more, the light source which illuminates the reticule appears to be very small. The light sources is not collimated with the reticules and at great distances it is possible to have the spot of light appear to one side of the reticules. It then becomes much more difficult to align with the reticules as the distance to the collimator is increased.

It is the aim of the present invention to overcome these difficulties by providing an improved arrangement of the collimator reticules coupled with an improved means for illuminating the reticules.

The invention is carried out by locating the second collimator reticule at a short distance from the focal point of the objective lens thereby increasing the optical distance between the telescope and the second reticule. The invention further contemplates that the reticules be illuminated by arranging the light source so that, in effect, the reticules themselves appear to be the light source thereby eliminating the problem of aligning the light source with the reticules.

The above and other advantages will be made more apparent from the following specification taken in conjunction with the accompanying drawing wherein like reference numerals refer to like parts, and wherein.

Figure 1:
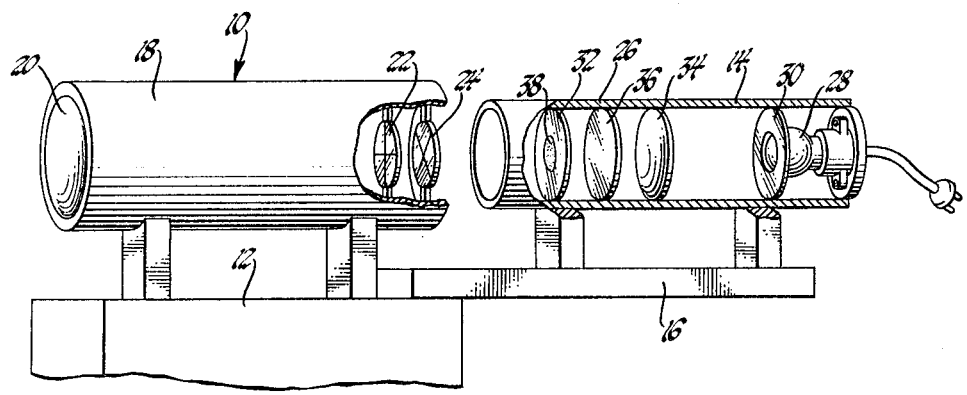
FIGURE 1 is an illustration of a collimator according to the invention.

FIGURE 1 shows a collimator 10 on a masonry support 12. A light tube 14 is disposed at one end of the collimator and is also mounted on the masonry support 12 by a light tube support 16. The collimator 10 includes an envelope 18 and objective lens 20. A first reticule 22 is located at the focal point of the objective lens 20 and a second reticule 24 is spaced slightly behind the first reticule 22. The light tube includes an envelope 26, a frosted bulb 28 at one end partly masked by a disc 30 with an aperture in the center, and a condenser arrangement forwardly of the aperture disc 30. The condenser comprises a first condenser lens 32, and a second condenser lens 34 separated by a disc of heat absorbing glass 36. The condenser 32 has its central portion painted or otherwise masked out by a dark field stop 38. The elements in the light tube 14 are so arranged with respect to the collimator 10 that the light from the frosted bulb 26 is directed onto the reticules 22, 24 but, due to the presence of the dark field stop 38, none of the light from the bulb 28 can pass directly to the objective lens 20. However, since the reticules are illuminated, they will disperse some light toward the objective lens and hence appear to be the source of illumination. Desirable reticules for so dispersing the light may comprise discs of flat optical glass with thin metal lines evaporated thereon, crossed quartz fibers, or discs of glass with thin lines scratched thereon. It may even be desired to use a single thick disc of glass with the reticules formed on opposite sides thereof. This type of illumination has been previously known in the field of microscopy as dark field illumination and has been used there to achieve excellent resolution of the specimen. In its aplication to collimators, however, the effect of dark field illumination goes further. It not only provides a high resolution of the reticules, but it also makes the reticules much easier to see in that it provides a white reticule image on a dark background and it maintains image brightness over long range use.

One specific example of a collimator which has been found to be very satisfactory comprises an objective lens 20 four inches in diameter and having a focal length of 40 inches with the first reticule 22 placed in the focal plane of the lens and the second reticule 24 placed three-quarters to one inch behind reticule 22. Hence the reticule 22 will appear to be at infinity while the reticule 24 will appear to be at 100 or 200 feet "beyond infinity." That is, the light from any point on reticule 24 passes through the objective lens 20 and converges toward the viewing telescope. Then, in order to focus the viewing telescope on the converging light, the eyepiece must be moved toward its objective lens and past the point at which it would be focused on an object of infinity. Hence, the reticule 24 optically appears to be beyond infinity. Therefore, when viewed with the telescope it will be possible to place the telescope immediately adjacent the collimator and focus on either of the reticules 22, 24 even though the telescope has a minimum focus of 100 feet. In a comparatively crude collimator this advantage could be obtained by placing the second reticule between the objective lens 20 and its focal point. However, such a construction would create possible error and instability sources which arise when another piece of glass or other reticule is introduced between the objective and primary reticule of a collimator.

Figure 2:
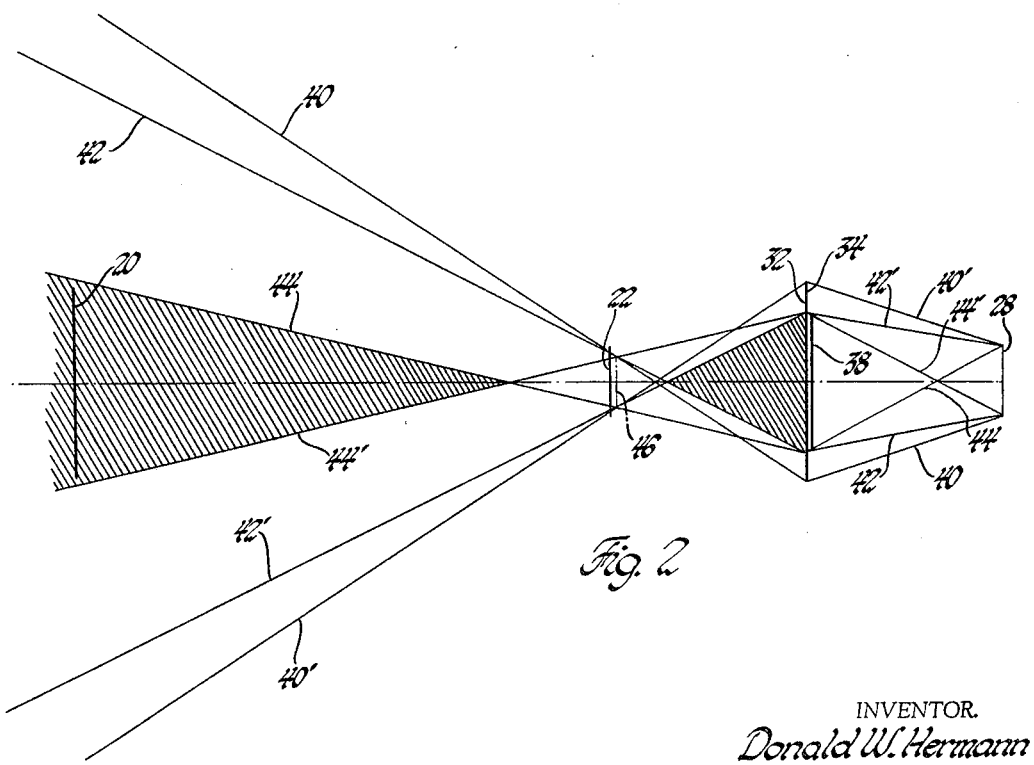
FIGURE 2 is a diagram illustrating the optical characteristics of the illumination system according to the invention.

A preferred light tube comprises the frosted bulb 28 shielded by the disc 30 with a one inch diameter aperture. Each condenser lens 32, 34 is plano-convex with the convex side toward the heat absorbing glass and each having a diameter of two and one-half inches and a focal length of four inches. They are then arranged to focus the light from bulb 28 onto a plane near the reticules 22, 24 so that the latter are well illuminated. The dark field stop on lens 32 is made large enough merely to mask out the light rays which normally would pass into the objective lens 20. This is diagrammatically illustrated in FIGURE 2 wherein, for convenience, the condenser is depicted as a single element 32, 34 with a dark field stop 38. The aperture limited light source is at 28, the objective lens of the collimator is at 20 and, for simplicity, a single reticule 22 is shown. The limiting light rays passing from the source to the collimator are shown as 40, 40', 42, 42', 44 and 44'. The image of the light source is formed at 46. The reticule 22 is spaced a short distance from the image 46 so that defects in the image 46 will not be in sharp focus on the reticule and the reticule will be evenly illuminated. It is readily seen that, while the reticule is well illuminated by light directed thereon from the peripheral portions of the condenser, the dark field stop 38, in effect, casts a shadow limited by the rays 44, 44' and which includes the area occupied by the objective lens 20. Hence, no light can fall on the objective lens 20 except that which is dispersed by the cross lines of the reticule 22.

In operation, the improved collimator is illuminated by connecting the lamp 28 to a source of electricity and then a telescope is placed in approximate alignment with collimator and as close thereto as desired. Then the telescope is alternately focused on the first and second reticules and the telescope is moved laterally and/or vertically until the reticule images appear in the same place in the telescope field, as described above.

It will thus be seen that the herein described invention provides a simple solution to a long existing problem; that is, it provides a high stability collimator with which a telescope may be easily and accurately aligned, either at close range or long range, and provides illumination of collimator reticules of higher resolution and greater visibility than those which have been previously available.

The embodiment of the invention described herein is for purposes of illustration and the scope of the invention is intended to be limited only by the following claims.

I claim:

1. In a collimator having an objective lens, a first reticule at the focal point of the lens, a second reticule slightly spaced beyond the focal point so that when viewed through the objective lens by means of a sighting device the first reticule will appear at infinity focus of said device and the second reticule will appear at a focus of said device further than infinity, means for illuminating the reticules comprising a light source, a condenser between the light source and the reticules to focus light onto the reticules, and a dark field stop between the light source and the reticules to prevent light passing directly from the source to the objective lens.

2. In a collimator, an objective lens, a first stationary reticule at the focal point of the lens, a second stationary reticule adjacent the first and spaced slightly beyond the focal point of the lens, so that when viewed through the objective lens by means of a sighting device the first reticule will appear at infinity focus of said device and the second reticule will appear at a focus of said device further than infinity and means for illuminating the reticules.

References Cited by the Examiner

UNITED STATES PATENTS

| 1,006,699 | 10/1911 | Straubel | 88—32 |
| 2,171,571 | 9/1939 | Karnes | 88—1 |
| 2,392,979 | 1/1946 | Douden | 88—1 |
| 2,812,686 | 11/1957 | Sinclair | 88—40 |

FOREIGN PATENTS 416,037  10/1910  France.

OTHER REFERENCES

Bausch and Lomb, Dark Field Optical Systems, Bausch and Lomb Optical Co., Rochester, N.Y. p. 10.

K & E (Advanced Technical Release), Keuffel and Esser Co., Hoboken, N.J., September 1961, pp. 2–3.

Kissam, Philip; Optical Tooling, McGraw-Hill Book Co., Inc., New York, June 19, 1962, pp. 102–104.

JEWELL H. PEDERSEN, *Primary Examiner.*

O. B. CHEW, *Assistant Examiner.*